United States

Yoshikawa et al.

4,127,744

Nov. 28, 1978

[54] MOBILE RADIO COMMUNICATION SYSTEM

[75] Inventors: Noriaki Yoshikawa; Masayuki Sakamoto, both of Yokosuka, Japan

[73] Assignee: Nippon Telegraph and Telephone Public Corporation, Tokyo, Japan

[21] Appl. No.: 815,750

[22] Filed: Jul. 14, 1977

[30] Foreign Application Priority Data

Jul. 24, 1976 [JP] Japan .................. 51/88395

[51] Int. Cl.² .............................. H04Q 7/04
[52] U.S. Cl. ................................ 179/2 EB; 325/55
[58] Field of Search ............... 179/2 EB; 325/54

[56] References Cited

U.S. PATENT DOCUMENTS

2,848,545  8/1958  Mitchell ................... 325/55
3,898,390  8/1975  Wells et al. ............... 179/2 EB
3,913,017  10/1975  Imaseki ................... 179/2 EB Primary Examiner—William C. Cooper
Assistant Examiner—Kenneth A. Chayt
Attorney, Agent, or Firm—Sughrue, Rothwell, Mion, Zinn and Macpeak

[57] ABSTRACT

Mobile subscribers are divided into a plurality of groups. In an area having a large number of mobile subscribers, individual control channels are used for each of the mobile subscriber groups and in an area having a small number of mobile subscribers, one of the abovesaid control channels is used in common to at least two of the mobile subscriber groups. An idle mobile subscriber is automatically set in the abovesaid control channel and, in case of communication, it is set in an idle communication channel assigned by a base station through the control channel to communicate with the base station.

6 Claims, 10 Drawing Figures

| $C_0$ | $C_1$ | $C_2$ | $X_0$ | $X_1$ | -------- | $X_{19}$ | $X_{20}$ | I |

MOBILE RADIO COMMUNICATION SYSTEM

BACKGROUND OF THE INVENTION

This invention relates to a mobile radio communication system which simultaneously covers an area having a large number of mobile subscribers and an area having a small number of mobile subscribers, and more particularly to an economical control channel selection system.

To cover a large number of mobile subscribers, many radio channels are required. For example, in a land mobile telephone system presently under consideration, the use of 1,000 channels is planned. For the most efficient use of these radio channels, it is desired that each of the mobile units have the function of selectively using all of the radio channels. In practice, however, since this is technically impossible and seriously disadvantageous from the economical point of view, it has been proposed to divide the mobile subscribers into a plurality of groups and employ different channels for the respective groups. Further, in a mobile radio communication system employing a large number of radio channels, one radio channel is fixedly determined as a control channel and the other radio channels are used as speech channels, and the mobile units are always tuned to the control channel when in the waiting state. Each mobile unit is called with high-speed digital signals through the control channel, and speech channel assignment, etc., are achieved, thereby permitting the mobile unit to communicate with a base station through one idle speech channel assigned by the base station. Where the mobile units are divided into a plurality of groups, the control channel differs with the groups. Since the mobile subscribers move in and out of large and small cities, it is necessary that a base station in an area having a small number of mobile subscribers have equipment of the same scale as in a mobile station in larger cities in connection with the control channel so as to enable transmission in, and reception from, the control channels of the respective groups. For example, in the case of four groups of mobile subscribers, four control channels are needed. Also, in an area where the number of mobile subscribers is small and hence traffic density is so low that about two to ten speech channels are sufficient, the base station is still required to be provided with equipment for four control channels. Accordingly, the conventional system is economically disadvantageous.

SUMMARY OF THE INVENTION

An object of this invention is to provide a mobile radio communication system which simultaneously covers an area having a large number of mobile subscribers and an area having a small number of mobile subscribers and which enables simplification of the equipment required at the base station in the area having the small number of mobile subscribers.

Another object of this invention is to provide a mobile radio communication system which simultaneously covers an area having a large number of mobile subscribers and an area having a small number of mobile subscribers and which enables equipment of the mobile subscribers to be relatively simple and permits simplification of equipment for a control channel in the base station in the area having the small number of mobile subscribers.

Still another object of this invention is to provide a mobile radio communication system which simultaneously covers an area having a large number of mobile subscribers and an area having a small number of mobile subscribers and in which the mobile subscribers are divided into a plurality of groups; in the area having the large number of mobile subscribers, individual control channels are assigned to the mobile subscriber groups and, in the area having the small number of mobile subscribers, one of these control channels is assigned to at least two of the mobile subscriber groups, thereby preventing, when a member of one of the subscriber groups from the small subscriber area moves into the area having a large number of mobile subscribers, this member from remaining set in the abovesaid common control channel through which communication would be uncontrollable, rather than being assigned one of the individual control channels associated with the large subscriber area.

In a mobile radio communication system which simultaneously covers an area having a large number of mobile subscribers and an area having a small number of mobile subscribers and in which an idle mobile subscriber is automatically tuned to a control channel and, in case of communication, tuned to an idle speech channel assigned by a base station through the control channel to communicate with the base station, the mobile subscribers are divided into $n$ (a positive integer larger than or equal to 2) groups and, in the area having the large number of mobile subscribers, individual control channels are used for the mobile subscriber groups and, in the area having the small number of mobile subscribers, one of the abovesaid control channels is used in common for at least two of the mobile subscriber groups. Accordingly, the base station in the area having the large number of mobile subscribers requires transmitters and receivers for all the control channels assigned to the mobile subscriber groups, but, in the base station in the area having the small number of mobile subscribers, it is sufficient to provide a transmitter and a receiver for only the abovesaid common control channel.

In the mobile radio communication system, the service area is usually divided into a plurality of zones and, in adjoining zones, different speech channels and control channels are used. Accordingly, a plurality of control channels are employed in the entire service area and when the mobile subscriber has moved from one of the zones to another, the mobile subscriber scans the aforementioned mentioned plurality of control channels, and is automatically set in the control channel of the new zone. A plurality of control channels are individually assigned to the plurality of groups and a mobile subscriber in a group uses one of the control channels assigned to the group in accordance with the zone in which the mobile subscriber is moving. In the area having a small number of mobile subscribers, however, a single control channel is assigned in common to at least two mobile subscriber groups in one zone, and in a zone adjacent thereto another single control channel is assigned in common to these same mobile subscriber groups. Therefore, for one mobile subscriber group, the control channel used in the area having a large number of mobile subscribers and the control channel used in the area having a small number of mobile subscribers will be the same, but in the remaining mobile subscriber groups, the abovesaid two control channels are different from each other. In the latter mobile subscriber groups, when the mobile subscriber is not captured as a result of scanning of the control channels assigned in connection with the area having a large number of mobile subscribers, the mobile subscriber is automatically assumed to have moved to the area having a small number of mobile subscribers, and the common control channels are scanned to capture one of them. Consequently, if the control channel were temporarily cut off by some cause while the mobile subscriber is still moving in the area having a large number of mobile subscribers, the mobile subscriber would capture one of the common control channels and be set therein, thereby making calling impossible because the base station would still call the mobile subscriber through the control channel peculiar to the group. To avoid this undesirable result, the base station sends a code indicating that the mobile subscriber may capture the common control channel and may be set therein and, only when it has received this code, can the mobile subscriber be set in the common control channel; if it does not receive the code, the mobile subscriber is not set in the common control channel.

DETAILED DESCRIPTION OF THE INVENTION

Figure 1:
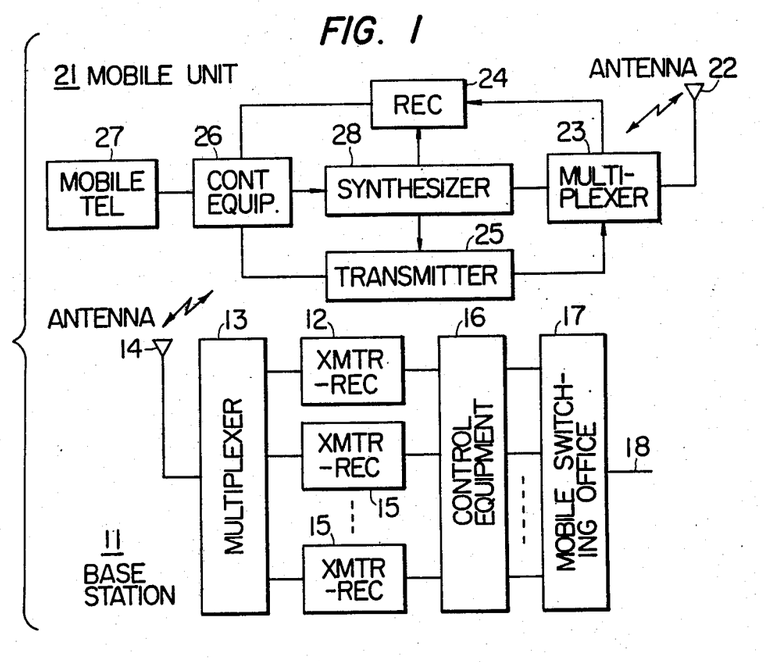
FIG. 1 is a block diagram schematically showing the mobile radio communication system including a base station and a mobile unit.

In a base station 11, a transmitter-receiver 12 for a control channel is connected to an antenna 14 through a multiplexer 13, as shown in FIG. 1. To the antenna 14 are connected also a plurality of transmitter-receivers 15 for speech channels through the multiplexer 13. These transmitter-receivers 12 and 15 are connected to a base station control equipment 16. The control equipment 16 is connected through a switching office 17 to a circuit 18 for connection with ordinary telephones. In some cases, the control equipment 16 and the switching office 17 are provided in individual stations, or the control equipment 16 is divided in terms of function and only one part is provided in the base station. In a mobile subscriber, that is, a mobile unit 21, an antenna 22 is connected to a receiver 24 and a transmitter 25 through a multiplexer 23. The receiver 24 and the transmitter 25 are connected to a mobile station control equipment 26, which is, in turn, connected to a mobile telephone 27 and a channel selection local oscillator, that is, the so-called synthesizer 28. In the mobile unit 21, the local oscillator 28 is always placed under the control of the control equipment 26 to tune the receiver 24 and the transmitter 25 to the control channel. That is, the mobile unit 21 is in its waiting state through the control channel.

When the mobile subscriber originates a call, the subscriber of the mobile unit 21 takes up the handset of the telephone 27 to control the transmitter 25 with a call origination signal from the control unit 26, by which a carrier of the control channel is modulated, and the modulated carrier is transmitted from the antenna 22. In the base station 11, the transmitted wave is received by the transmitter-receiver 12 through the antenna 14, and then applied to the control equipment 16, in which the call origination signal from the mobile unit 21 is detected and an idle radio speech channel is selected. A code assigning the selected speech channel is transmitted from the transmitter-receiver 12 over the control channel together with a code indicating the particular mobile unit 21. At the same time, a loop check tone is transmitted from one of the transmitter-receivers 15 through the assigned radio speech channel. In the mobile unit 21, the channel assignment code is decoded by the control equipment 26 to control the local oscillator 28, tuning the receiver 24 and the transmitter 25 to the assigned speech channel. When the receiver 24 receives the loop check tone signal from the base station 11, it is determined that the set speech channel is correct, and a loop check tone signal is transmitted from the transmitter 25 through the assigned speech channel. When the loop check tone signal is received by the transmitter-receiver 15 in the base station 11, the control equipment 16 determines that the mobile unit 21 has been switched from the control channel to the assigned speech channel, and connects the transmitter-receiver 15 through the control equipment 16 to a communication circuit between it and the switching office 17. A signal ordering the sending of dial signals is transmitted from the switching office 17 through the speech channel. After this ordering signal is received in the mobile unit 21, the distant subscriber's number is dialed to send dial signals to the base station 11 through the control equipment 26. The switching office 17 analyzes the dial signals and connects them to an ordinary subscriber, thereby providing communication.

In the case of calling the mobile unit 21 from the base station 11, a paging signal is transmitted to the mobile unit 21 through the control channel, and the mobile unit 21 receives the paging signal and transmits a reply signal for paging to the base station 11 through the control channel under the control of the control equipment 26. When the base station 11 receives this reply signal, an idle radio speech channel is assigned by the same operations as described above for the situation when the modulated carrier is received because of a call origination, and the mobile unit 21 is set to the assigned channel. Upon reception of the loop check tone signal by the base station 11, a speech circuit is connected in the same manner as described above, and then a subscriber reply tone is transmitted from the control equipment 16 through the speech channel. When the mobile subscriber transmits a reply tone signal in response to the alerting signal, the base station 11 detects the reply tone signal and applies information of the mobile subscriber's reply to the switching office 17 through a signal line of the speech circuit, thus enabling talking. The controls by the control equipments 16 and 26 described above can be achieved by a program control using a kind of electronic computer. For instance, the techniques disclosed in U.S. Pat. No. 3,663,762 (May 16, 1972) can be employed.

Figure 2:
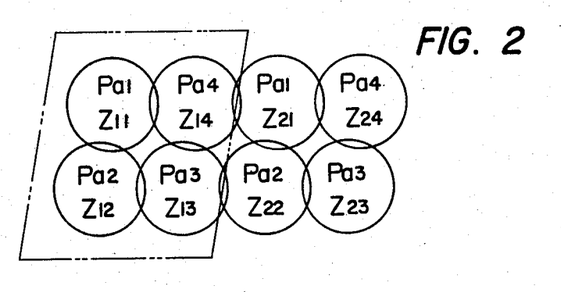
FIG. 2 is a diagram showing the relationship between a radio zone and a control channel in the case where mobile units are not divided in groups.

In the case where the mobile unit moves about a wide area, the wide service area is divided into a plurality of zones $Z_{11}$ to $Z_{24}$ and, for example, four adjoining zones form one group, as shown in FIG. 2. Control channels Pa1, Pa2, Pa3 and Pa4 are respectively assigned to the four zones of each group to cover the wide area. For example, the mobile unit in the zone $Z_{11}$ is always in its waiting state in the control channel Pa1 to watch the SN radio of the control channel at all times. When this mobile unit has moved into the zone $Z_{12}$, the SN ratio of the control channel Pa1 is degraded. If the SN ratio falls below a reference value, the control channels are sequentially changed over to select a control channel of excellent SN ratio, Pa2 in this example, and the receiver 24 and the transmitter 25 are set to the selected control channel and remain in their waiting state. Such operations can be automatically achieved in accordance with a control program stored in a control memory of a micro computer which is provided for example, in the control equipment 26.

Figure 3:
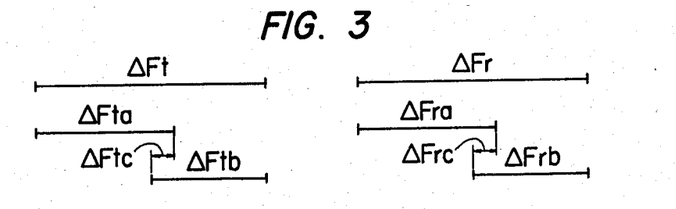
FIG. 3 is a diagram illustrating the relationship between a transmit-band and a receive-band of the mobile units and their grouping.
Figure 4:
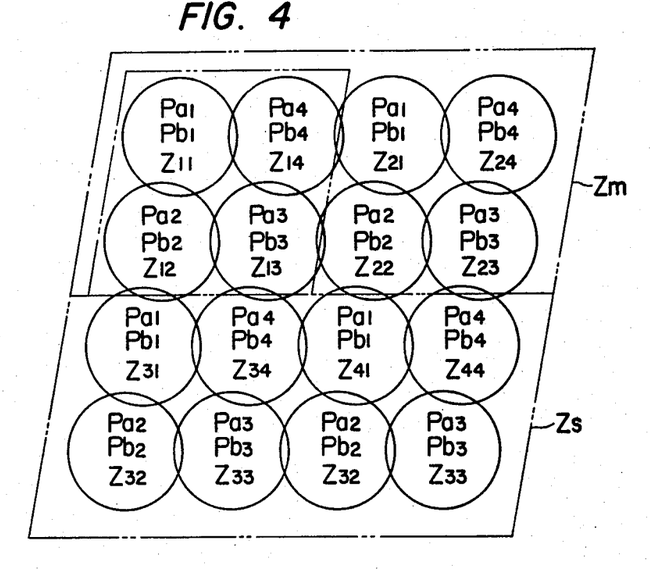
FIG. 4 is a diagram showing the relationship between the radio zone and the control channel in the prior art.

As illustrated in FIG. 3, the transmission sides of the plurality of channels which the mobile subscribers can use are continuously arranged as one transmit-band $\Delta Ft$ in terms of frequency, and the reception sides are continuously arranged as one receive-band $\Delta Fr$ separated from the transmit-band $\Delta Ft$. In the mobile unit 21, the bands are separated by a filter provided in the multiplexer 23. As the number of mobile subscribers increases to increase the number of channels used, the bands $\Delta Ft$ and $\Delta Fr$ become large, and, if the center frequencies of the bands $\Delta Ft$ and $\Delta Fr$ are respectively the same as those before the number of channels was increased, the fractional band width increases to introduce much difficulty in the designing of the transmission and reception separating filter and make the filter bulky and expensive. In view of this, it has been proposed to divide the transmit-band $\Delta Ft$ into two upper and lower bands $\Delta Fta$ and $\Delta Ftb$ and the receiver band $\Delta Fr$ into two upper and lower bands $\Delta Fra$ and $\Delta Frb$, as shown in FIG. 3. And in this case, the mobile subscribers of a group A use the bands $\Delta Fta$ and $\Delta Fra$ and the mobile subscribers of a group B the bands $\Delta Ftb$ and $\Delta Frb$. This reduces the fractional band width of the transmission and reception separating filter to facilitate the designing of the filter and render it inexpensive and small. FIG. 3 shows the case in which the transmit-band $\Delta Ft$ and the receive-band $\Delta Fr$ are respectively divided into two and, at the same time, bands $\Delta Ftc$ and $\Delta Frc$ are provided in common to the groups A and B to ensure economical frequency utilization. However, such common bands $\Delta Ftc$ and $\Delta Frc$ need not always be provided.

Where the mobile units are thus divided into groups, different control channels are assigned to the individual groups. For instance, as depicted in FIG. 4, the entire service area is covered by tetrads of zones, the control channels Pa1 to Pa4 are respectively assigned to the mobile unit group A of each zone and the control channels Pb1 to Pb4 are respectively assigned to the mobile unit group B of each zone. In FIG. 4, reference character Zm indicates an area in which the number of mobile subscribers is large such as a big city (which area Zm will hereinafter be referred to as the big city) and Zs indicates an area in which the number of mobile subscribers is small such as a little city (which area Zm will hereinafter be referred to as the little city). In the little city Zs, the traffic density is low but since the mobile units of the both groups A and B come in and go out of the little city Zs, too, it would be necessary to provide in the base station of each zone a transmitter-receiver for two control channels, that is, the control channel Pa for the group A and Pb for the group B. This leads to the disadvantage that equipment of the base station is would have to be large-scaled for the traffic density.

Figure 5:
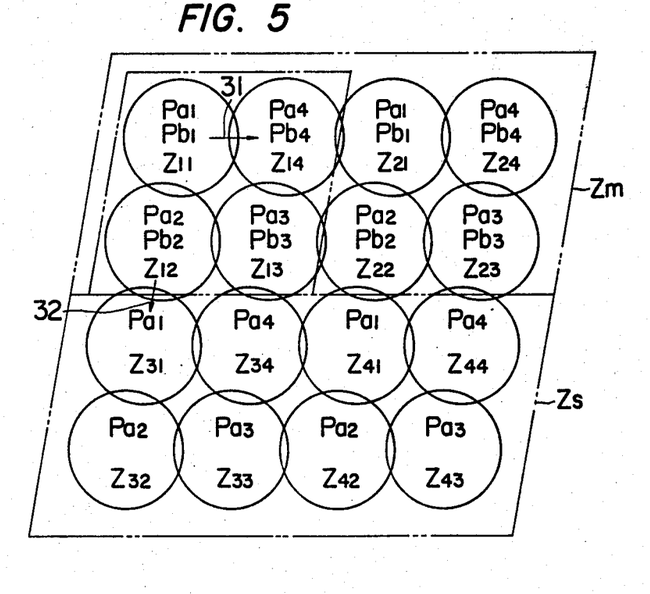
FIG. 5 is a diagram showing an example of the relationship between the radio zone and the control channel in the mobile radio communication system of this invention.

In accordance with an embodiment of this invention, in the little city Zs, the control channels Pa1 to Pa4 are assigned in common not only to the group A but also the group B. Accordingly, only the transmitter-receiver for the control channel Pa is provided in the base station of each zone of the little city Zs, as illustrated in FIG. 5. For example, in the case where the mobile unit of the group B has moved from the zone $Z_{11}$ to $Z_{14}$ in the big city Zm as indicated by the arrow 31, deterioration of the SN ratio of the control channel Pb1 received in the zone $Z_{11}$ is detected by the mobile unit and the control channel Pb2 to Pb4 are sequentially changed over to search for a channel of an excellent SN ratio. In this instance, the mobile unit detects that the SN ratio of the channel Pb4 is excellent, and comes to be in its waiting state in the control channel Pb4. In the case of the mobile unit of the group A, switching from the control channel Pa1 to Pa4 takes place similarly.

On the other hand, in the case of moving from the zone $Z_{12}$ of the big city Zm to the zone $Z_{31}$ of the little city as indicated by the arrow 32, the mobile unit of the group A performs the same operation as described above and the control channel is changed over from Pa2 to Pa1. In the case of the mobile unit of the group B, the SN ratio of the control channel Pb2 received in the zone $Z_{12}$ is degraded and a control channel of excellent SN ratio is searched in the control channels Pb1 to Pb4 for the group B at first but cannot be obtained, so that the control channels Pa1 to Pa4 for the group A are checked for a control channel of excellent SN ratio. As a result of this, the mobile unit detects that the control channel Pa1 has an excellent SN ratio and gets in its waiting state in this channel.

Where the SN ratio of the control channel Pb2 is deteriorated by a propagation trouble or some other cause in the zone $Z_{12}$ in the big city Zm, there is the possibility that the mobile unit of the group B moving in the zone $Z_{12}$ performs the abovesaid control channel searching operation to capture the control channel Pa2 for the mobile unit of the group A, making it impossible to call the mobile unit of the group B from the base station of the zone $Z_{12}$. To avoid this, in the little city Zs, there is inserted a code indicating that the mobile units of the group B can also be used in the control channels Pa1 to Pa2 and in the case where this code is not available, even if the SN ratios of the control channels Pb1 to Pb4 are poor, the mobile units of the group B are prevented from using the control channels Pa1 to Pa4.

Figure 6:
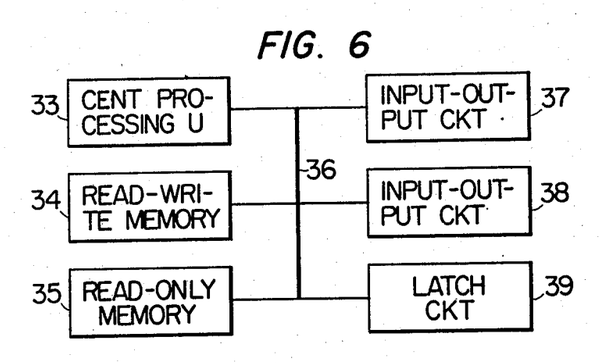
FIG. 6 is a block diagram schematically illustrating a structure for a program control.

The control channel selecting operation described above can be achieved by a program control using an electronic computer, as mentioned previously. For example, as illustrated in FIG. 6, a central processing unit 33, a read-write memory 34 and a read-only memory 35 are interconnected through a bus 36. The bus 36 is further connected to an input-output circuit 37 connected to the receiver 24 in FIG. 1, an input-output circuit 38 connected to the transmitter 25 and a latch circuit 39 connected to the local oscillator 28. The input-output circuit 37 provides a signal indicating the SN ratio of the control channel, a code indicating that other control channels than those for a particular group of mobile units can be scanned, and various other signals. The read-only memory 35 has stored therein various control programs. In the read-write memory 34, data necessary for processing are temporarily stored, and read out again, or used for rewriting of the memory 34. When a code indicating a channel is latched in the latch circuit 39, the local oscillation 28 (FIG. 1) is controlled by the code and the receiver 24 and the transmitter 25 are set in the assigned channel. It is convenient to set up the control channels Pa1 to Pa4 and Pb1 to Pb4 within the common bands ΔFtc and ΔFrc in FIG. 3, respectively.

Figure 7:
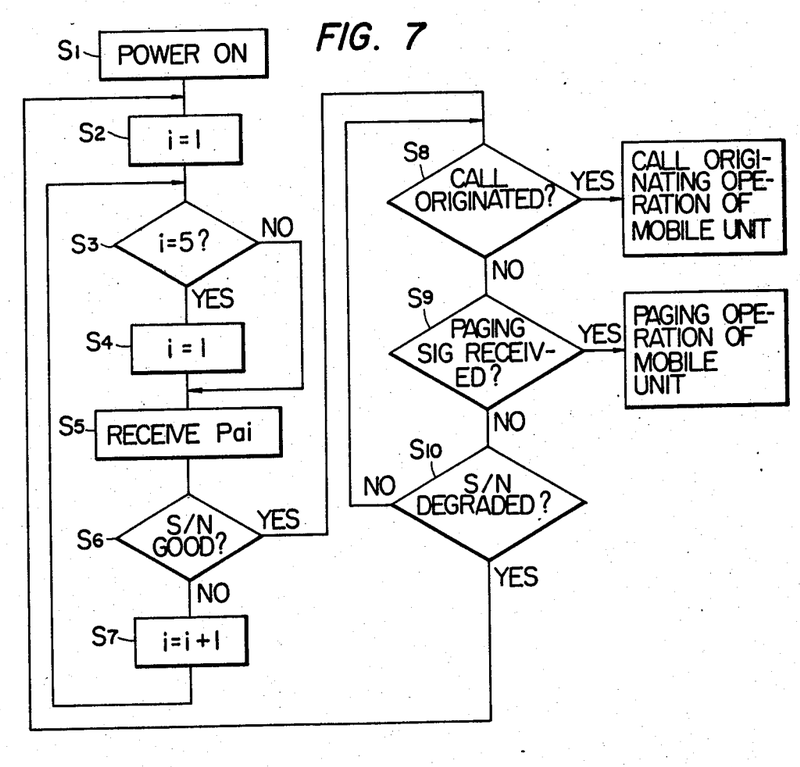
FIG. 7 is a flow chart showing the control channel setting control operation of each of the mobile units of one of two groups of them.

The control channel setting operation of the mobile unit of the group A takes place, for example, in accordance with the flow chart shown in FIG. 7. When a power source is connected at step $S_1$, $i$ of the control channel Pai is set at "1" at the next step $S_2$. At the next step $S_3$, it is checked whether or not the last selectable control channel has already been finished, that is, whether $i$ equals 5 or not, since the channel Pa4 is the last one in this example. If $i$ is not 5, the receiver and the transmitter are set in the control channel Pai set at step $S_5$, that is, Pa1 currently. It is checked whether the SN ratio at that time is excellent or not at step $S_6$. In the case of degraded SN ratio, "1" is added to $i$ at step $S_7$, so that $i = 2$ in this instance, and the operation returns to step $S_5$ for checking whether or not $i = 5$. If not, the receiver and the transmitter are set in the control channel Pa2 that $i = 2$, and its SN ratio is similarly checked. Thereafter, similar operations are repeated. Unless the SN ratio at the time of setting the receiver and the transmitter in the last channel Pa4 is excellent, sequential scanning of the control channels Pa1 to Pa4 is repeated until an excellent SN ratio obtained at step $S_6$ after detection of $i = 5$ at step $S_3$ and setting $i = 1$ at the next step $S_4$ and after step $S_5$. That is, the control channel searching state is maintained. When an excellent SN ratio is detected at step $S_6$, the operation proceeds to step $S_8$ at which it is checked whether the handset has been lifted or not. Where the handset has been lifted, the operation proceeds to a program of the call originating operation of the mobile unit. Where the handset has not been lifted, it is checked whether a paging signal has been received or not at step $S_9$ and when the paging signal is detected the operation proceeds to a paging operation program. Where no paging signal is detected, deterioration of the SN ratio is checked at step $S_{10}$. If the SN ratio is not degraded, the operation returns to step $S_8$ and similar operations are repeated. That is, the state in which the steps $S_8$ to $S_{10}$ are repeated is the waiting state. If deterioration of the SN ratio is detected, the operation returns to step $S_2$ to resume the control channel searching operation.

Figure 8:
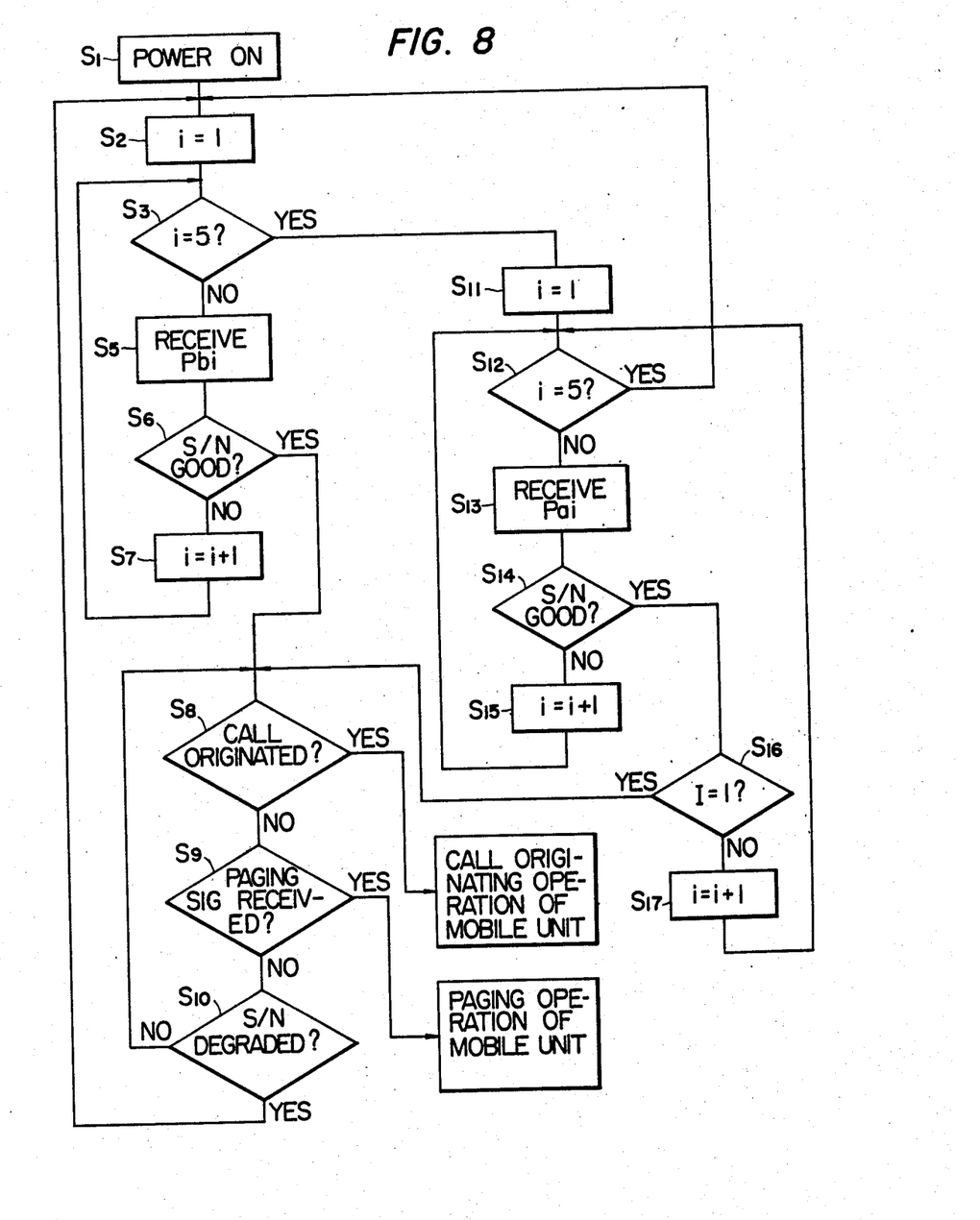
FIG. 8 is a flow chart showing the control channel setting control operation of the mobile unit of the other group.

Turning now to FIG. 8, a description will be given of the control channel setting operation in the mobile unit of the group B. At steps $S_1$ to $S_{10}$, the same operations as those in the control channel setting in the mobile unit of the group A take place but, in this case, the operations are achieved in connection with the control channels Pb1 to Pb4. Further, when $i = 5$ at step $S_3$, that is, when all of the control channels Pb1 to Pb4 assigned to the group B have been sequentially changed over, the operation shifts to step $S_{11}$ where $i = 1$ is set in the commonly assigned control channel Pai. At the next step $S_{12}$, it is checked whether scanning of the control channel Pai has been completed or not. In this example, it is checked whether $i$ of the control channel Pai is 5 or not, and if not, the transmitter and the receiver are set in the control channel Pa1 at step $S_{13}$. At step $S_{14}$, it is detected whether the SN ratio at that time is excellent or not, and if the SN ratio is deteriorated, $i = i + 1$ is set at step $S_{15}$ and at step $S_{12}$, it is checked whether $i$ becomes 5 or not. Then, the transmitter and the receiver are set in the next control channel Pa2 at step $S_{13}$. In this manner, the control channels Pa1 to Pa4 are searched. When the SN ratio is detected to be excellent at step $S_{14}$, the operation shifts to step $S_{16}$ at which it is checked whether or not a code I has been received which indicates that the mobile units of the group B can use the common control channels Pa1 to Pa4. When the code I is detected, the operation shifts to step $S_8$ at which the waiting state is provided as described previously in connection with FIG. 7. In the case where the code I is not detected, "1" is added to $i$ at step $S_{17}$ and the operation returns to step $S_{12}$ and the search in the control channels Pa1 to Pa4 is continued. Where $i = 5$ at step $S_{12}$ and none of the control channels Pa1 to Pa4 has excellent SN ratio, or even where any one of them has good SN ratio, if the code I is not detected, the mobile unit of the group B is assumed to be moving in the big city Zm and the operation returns to step $S_2$ to resume searching of the control channels Pb1 to Pb4.

Figure 9:
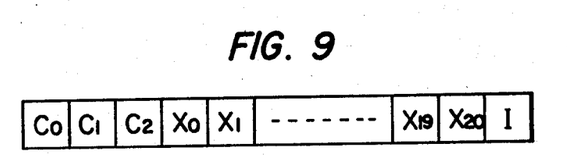
FIG. 9 is a diagram illustrating an example of a control code which is transmitted from the base station through the control channel.

The control signal sent from the base station through the control channel, as FIG. 9 shows an example of its format, is composed of codes $C_0$ to $C_2$ indicating a call originating signal, a paging signal, etc., codes $X_0$ to $X_{20}$ indicating the mobile unit number, an assigned channel number, etc. and a code I indicating that the mobile units of the group B can also use the control channels Pa1 to Pa4. For controlling the mobile units of each group, there is a method of transmitting and receiving all information through one control channel assigned to each zone, and a method of assigning a plurality of control channels to each zone and using them individually according to function. An example of the latter employs a call origination control channel for controlling a call origination from the mobile unit and a call termination control channel for controlling a call termination to the mobile unit. In this case, it is the call termination control channel to which the mobile unit is tuned in the waiting state. This control channel is predetermined as described above previously with regard to FIG. 5, and a code indicating the call origination control channel is sent out from the base station through the call termination control channel. In the case of the mobile unit originating a call, it is achieved through the assigned call origination control channel. It is also possible to insert the abovesaid code I in the control signal after the call origination control channel code delivered through the abovementioned call termination control channel. In the foregoing, the mobile units are divided into two groups, but this invention is also applicable to the case of dividing the mobile units into three or more groups. Further, the respective groups of mobile units are described to employ different speech channel bands, but this invention is also applicable to the case where the speech channels used by the respective groups are arranged in the same frequency band and the respective groups are controlled through the individual control channels as described above. Moreover, one control channel is assigned to one ratio zone, but one control channel may also be assigned to numerous adjoining radio zones. In other words, this invention is also applicable to the case where in some areas, the speech channel differs with zones, but one control channel is used in common to the plurality of zones, and hence the control channel zone is larger than the speech zone.

As has been described in the foregoing, according to the mobile radio communication control system of this invention, since mobile subscribers are divided into a plurality of groups, the mobile units used can be easily designed and constructed at low cost and small. Further, the probability of the control channel becoming busy is reduced to enable rapid connections. In addition, in an area of low traffic density, one control channel is used in common to a plurality of groups of mobile subscribers, that is, only the minimum number of control channels necessary in terms of traffic is employed, so that the control channel equipment of the base station may be small-sized. Further in an area of high traffic density, the mobile units of each group cannot get in the waiting state control channels other than those of the group.

Figure 10:
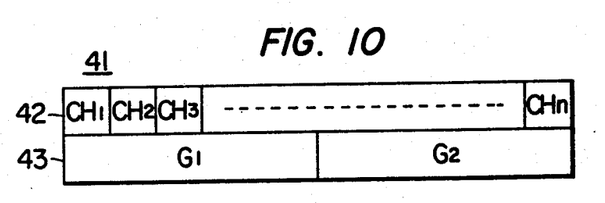
FIG. 10 is a diagram showing an example of a memory unit having stored therein the relationship between a speech channel of the base station and a usable mobile unit group.

In the above, in the case of assigning speech channels wich differ with the mobile unit group, if an idle speech channel is merely assigned in the base station, there is the possibility of assigning an unsettable speech channel in the mobile unit. To prevent such a possibility, codes 43, indicating the mobile unit groups to which the speech channels are respectively assigned, are each stored in a memory 41 of the control equipment 16 of the base station using, as an address, a code 42 indicating each speech channel CH, as shown in FIG. 10.

A group code, indicative of the group to which the mobile unit belongs, is also included in a control code which is transmitted from the mobile unit to the base station through the control channel. When the base station has selected an idle speech channel of the zone based on a call origination signal or a reply signal for paging, as described above, the memory 41 is read out with the code indicative of the selected speech channel used as an address, and then the group code thus read out and the group code sent from the mobile unit are collated with each other. And when the two group codes are coincident with each other, a code designating the selected speech channel is inserted in the control code, and transmitted from the base station through the control channel. Thus, by storing the group to which the speech channel belongs and collating the group of the selected speech channel and the group of the mobile unit with each other, the possibility of assigning an unsettable speech channel to the mobile unit can be avoided.

It will be apparent that many modifications and variations may be effected without departing from the scope of novel concepts of this invention.

What is claimed is:

1. A mobile radio communication system which simultaneously covers a service area including a first area having a large number of mobile subscribers and a second area having a small number of mobile subscribers and in which an idle mobile subscriber is automatically set in a control channel and, in case of communication, is set in an idle speech channel assigned by a base station through the control channel to communicate with the base station, characterized in that all the mobile subscribers are divided into a plurality of groups regardless of geographical location, that in the first area having a large number of mobile subscribers, a different one of a plurality of control channels is individually used for each of the plurality of groups of mobile subscribers, and that in the second area having a small number of mobile subscribers, one of said plurality of control channels is used in common for at least two of the plurality of groups of mobile subscribers.

2. A mobile radio communication system according to claim 1, wherein the service area is divided into a plurality of zones, wherein adjacent ones of the zones use different control channels, wherein the number of the control channels assigned to said second area is smaller than the number assigned to said first area, and wherein the mobile subscriber is automatically set in the control channel assigned to the group of the mobile subscriber in the zone in which the mobile subscriber is currently located by means for selecting one of a plurality of control channels predetermimed for the group of the mobile subscriber.

3. A mobile ratio communication system according to claim 2, wherein there is provided means for automatically scanning the control channels assigned to groups other than that of the mobile subscriber when the mobile subscriber is not set in one of a plurality of control channels preassigned to the group of the mobile subscriber as a result of scanning of the plurality of preassigned control channels.

4. A mobile radio communication system according to claim 1, wherein a base station having a small number of mobile subscribers transmits through the control channel a code indicating that each of the mobile subscribers may be set in the control channels assigned to groups other than that of the mobile subscriber, and wherein only when the code is received can the mobile subscriber be set in the control channels assigned to the groups other than that of the mobile subscriber.

5. A mobile radio communication system according to claim 4, wherein the control channels are each composed of a call origination control channel for controlling call origination from the mobile subscriber and a call termination control channel for controlling call termination to the mobile subscriber, and wherein said code is sent through the call termination control channel from the base station to the mobile subscriber.

6. A radio communication system according to claim 2, wherein at least one of the plurality of zones is subdivided into a plurality of smaller zones, and wherein the smaller zones are assigned different speech channels, respectively, but assigned a common control channel.

* * * * *